United States Patent
Tseng et al.

(10) Patent No.: US 11,748,062 B2
(45) Date of Patent: Sep. 5, 2023

(54) MULTIPLICATION AND ADDITION OPERATION DEVICE AND CONTROL METHOD FOR MULTIPLICATION AND ADDITION OPERATION THEREOF

(71) Applicant: MACRONIX International Co., Ltd., Hsinchu (TW)

(72) Inventors: Po-Hao Tseng, Taichung (TW); Feng-Min Lee, Hsinchu (TW); Yu-Hsuan Lin, Taichung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 222 days.

(21) Appl. No.: 17/344,500

(22) Filed: Jun. 10, 2021

(65) Prior Publication Data

US 2022/0236951 A1 Jul. 28, 2022

Related U.S. Application Data

(60) Provisional application No. 63/142,972, filed on Jan. 28, 2021.

(51) Int. Cl.
*G06F 7/523* (2006.01)
*G06F 7/02* (2006.01)
(Continued)

(52) U.S. Cl.
CPC ............... *G06F 7/523* (2013.01); *G06F 7/02* (2013.01); *G06F 7/50* (2013.01); *G06F 7/5443* (2013.01); *G06F 2207/4826* (2013.01)

(58) Field of Classification Search
CPC .......... G06F 17/153; G06F 17/16; G06F 7/02; G06F 7/50; G06F 7/523; G06F 7/5443;
(Continued)

(56) References Cited

U.S. PATENT DOCUMENTS

2002/0184284 A1 12/2002 Jennings, III
2020/0081687 A1 3/2020 Okumura
(Continued)

FOREIGN PATENT DOCUMENTS

TW 201921282 6/2019
TW 202038099 10/2020

OTHER PUBLICATIONS

M. Mukherjee et al., A Flexible Precision Multi-Format In-Memory Vector Matrix Multiplication Engine in 65 nm CMOS with RF Machine Learning Support, IEEE Solid-State Circuits Letters, vol. 3, 2020 (Year: 2020).*

(Continued)

*Primary Examiner* — Emily E Larocque
(74) *Attorney, Agent, or Firm* — J.C. PATENTS

(57) ABSTRACT

A multiplication and addition operation device and a control method thereof are provided. The multiplication and addition operation device includes a feature information filter and an in-memory calculator. The feature information filter records a plurality of designated bits of a plurality of feature information, compares received input information with the designated bits to generate a comparison result, and generates a selected address according to the comparison result. The in-memory calculator records all bits of the feature information, and generates an operation result by performing a multiplication and addition operation on the feature information and the input information according to the selected address.

16 Claims, 6 Drawing Sheets

(51) Int. Cl.
G06F 7/50 (2006.01)
G06F 7/544 (2006.01)

(58) Field of Classification Search
CPC .... G06F 2207/4802; G06F 2207/4826; G06N 3/04; G06N 3/0464; G06N 3/063; G11C 13/0021–003; G11C 11/4063–407; G11C 11/408–4099; G11C 11/413–419; G11C 11/1653–1675; G11C 11/2253–2275; G11C 7/063; G11C 8/00; G11C 8/06; G11C 8/08; G11C 8/10; G11C 8/12
See application file for complete search history.

(56) References Cited

U.S. PATENT DOCUMENTS

| | | |
|---|---|---|
| 2020/0218509 A1 | 7/2020 | Xu et al. |
| 2021/0011970 A1 | 1/2021 | Han |

OTHER PUBLICATIONS

Q. Zhu et al., Accelerating Sparse Matrix-Matrix Multiplication with 3D-Stacked Logic-in-Memory Hardware, IEEE 2013 (Year: 2013).*

Y.Y. Lin et al., A Novel Voltage-Accumulation Vector-Matrix Multiplication Architecture Using Resistor-shunted Floating Gate Flash Memory Device for Low-power and High-density Neural Network Applications, IEDM18-39, IEEE 2018 (Year: 2018).*

P.H. Tseng et al., A Hybrid In-Memory-Searching and In-Memory-Computing Architecture for NVM Based AI accelerator, 2021 Symposium on VLSI Technology Digest of Technical Papers, JSAP, 2021, (Year: 2021).*

Y.H Lin et al, NOR Flashed-based Multilevel In-Memory-Searching Architecture for Approximate Computing, 2022 IEEE International Memory Workshop (IMW), IEEE, 2022 (Year: 2022).*

"Office Action of Taiwan Counterpart Application", dated May 27, 2022, p. 1-p. 4.

* cited by examiner

MULTIPLICATION AND ADDITION OPERATION DEVICE AND CONTROL METHOD FOR MULTIPLICATION AND ADDITION OPERATION THEREOF

CROSS REFERENCE TO RELATED APPLICATION

This application claims the priority benefit of U.S. provisional application Ser. No. 63/142,972, filed on Jan. 28, 2021. The entirety of the above-mentioned patent application is hereby incorporated by reference herein and made a part of specification.

BACKGROUND

Technical Field

The invention relates to a multiplication and addition operation device and a control method of a multiplication and addition operation thereof, and particularly relates to a multiplication and addition operation device capable of reducing power consumption and a control method of a multiplication and addition operation thereof.

Description of Related Art

Along with advancement of electronic technology, artificial intelligence also has a booming development. In order to provide more efficient artificial intelligence calculation tools, so-called in-memory calculators have been proposed.

In addition, in a technical field of graphic comparison, content addressable memory plays an important role. In the prior art, a static memory is often used to implement the content addressable memory. However, in the current technical field, the static memory cannot meet high-density requirements of circuits.

An in-memory calculator constructed by a non-volatile memory is also a feasible method. However, under the premise that an amount of processed data is getting larger and larger, how to reduce power consumption required by the in-memory calculator has become an important issue.

SUMMARY

The invention is directed to a multiplication and addition operation device and a control method for multiplication and addition operation thereof, which are adapted to reduce unnecessary erroneous calculation operations to achieve an effect of reducing power consumption.

The invention provides a multiplication and addition operation device including a feature information filter and an in-memory calculator. The feature information filter records a plurality of designated bits of a plurality of feature information, compares received input information with the designated bits to generate a comparison result, and generates a selected address according to the comparison result. The in-memory calculator is coupled to the feature information filter. The in-memory calculator records all bits of the feature information. The in-memory calculator generates an operation result by performing a multiplication and addition operation on the feature information and the input information according to the selected address.

The invention provides a control method of a multiplication and addition operation including: providing a feature information filter to record a plurality of designated bits of a plurality of feature information; providing the feature information filter to compare received input information with the designated bits to generate a comparison result; and generating a selected address according to the comparison result; and enabling the selected address in an in-memory calculator to generate an operation result by performing a multiplication and addition operation on the feature information and the input information, wherein the in-memory calculator records all bits of the feature information.

Based on the above description, the multiplication and addition operation device of the invention first performs a filtering operation on input data through the feature information filter, and correspondingly generates the selected address. Then, the in-memory calculator enables a part of the selected address to perform a multiplication and addition operation on the feature information and the input information to generate the operation result. In this way, it is unnecessary to perform the multiplication and addition operation on the input information and all of the feature information. The in-memory calculator only needs to enable a part of the selected address to perform the multiplication and addition operation on the corresponding feature information and the input information, which effectively reduces power required in calculation and improve calculation efficiency.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
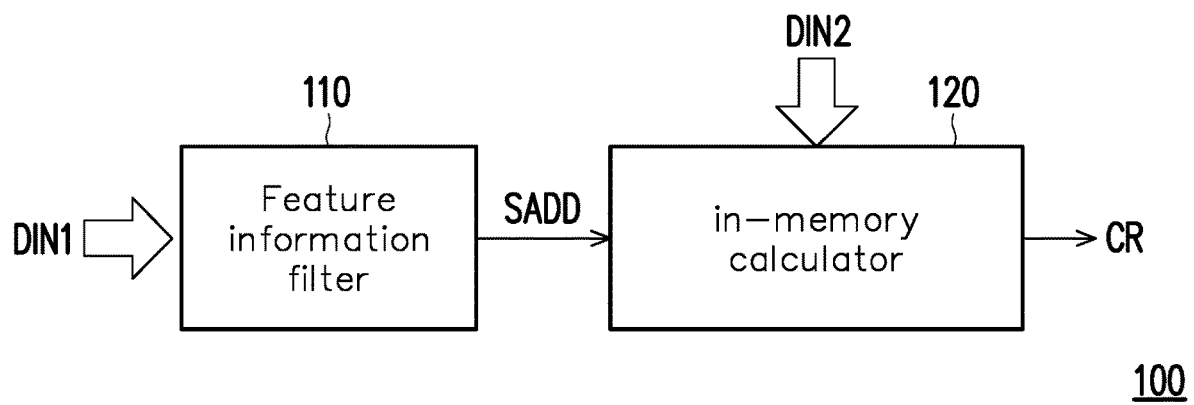
FIG. 1 is a schematic diagram of a multiplication and addition operation device according to an embodiment of the invention.

Referring to FIG. 1, FIG. 1 is a schematic diagram of a multiplication and addition operation device according to an embodiment of the invention. The multiplication and addition operation device 100 includes a feature information filter 110 and an in-memory calculator 120. The feature information filter 110 records a plurality of designated bits of a plurality of feature information. The feature information filter 110 receives setting bits DIN1 of input information, and compares the received setting bits DIN1 of the input information with the stored designated bits of the feature information to generate a comparison result, and generates a selected address SADD based on the comparison result.

In detail, the feature information may be extracted from sample information. In an artificial intelligence system, taking an application of image recognition as an example, a designer may create sample information serving as a basis for recognition, and perform a data extraction operation on the sample information to obtain feature information. In the embodiment, the feature information filter 110 does not store complete feature information, but only stores a plurality of designated bits in the feature information. Where, the designated bits may be the most significant bits (MSB) in the feature information.

The in-memory calculator 120 is coupled to the feature information filter 110. The in-memory calculator 120 records all of bits in the feature information. The in-memory calculator 120 generates an operation result CR by performing a multiplication and addition operation on the feature information and all bits DIN2 of the input information according to the selected address generated by the feature information filter 110.

In the embodiment, taking the application of image recognition as an example, the setting bits DIN1 of the input information is recognized image information. The feature information filter 110 may first compare setting bits DIN1 of the input information with the designated bits of the feature information to perform a pre-selection operation on the input information. Through the pre-selection operation, the feature information filter 110 may generate the selected address SADD based on the comparison result, where the selected address SADD is an address in the in-memory calculator 120 that stores feature information related to the input information.

Based on the above description, when image recognition is performed, the in-memory calculator 120 may receive the all bits DIN2 of the input information, and enable the feature information stored in the corresponding selected address SADD to perform the multiplication and addition operation on the feature information stored in the corresponding selected address SADD and the all bits DIN2 of the input information, and generate the operation result CR.

According to the above description, it is known that the multiplication and addition operation device 100 of the embodiment of the invention may use the feature information filter 110 to perform a pre-selection operation on the input information. Then, through the selected address SADD obtained in the pre-selection operation, the in-memory calculator 120 provides partial (homologous to the input information) feature information to execute the multiplication and addition operation with the all bits DIN2 of the input information. In this way, the in-memory calculator 120 is unnecessary to use all of the feature information to execute the multiplication and addition operation with the input information DIN, which may effectively reduce complexity of the operation and save unnecessary power consumption.

Figure 2:
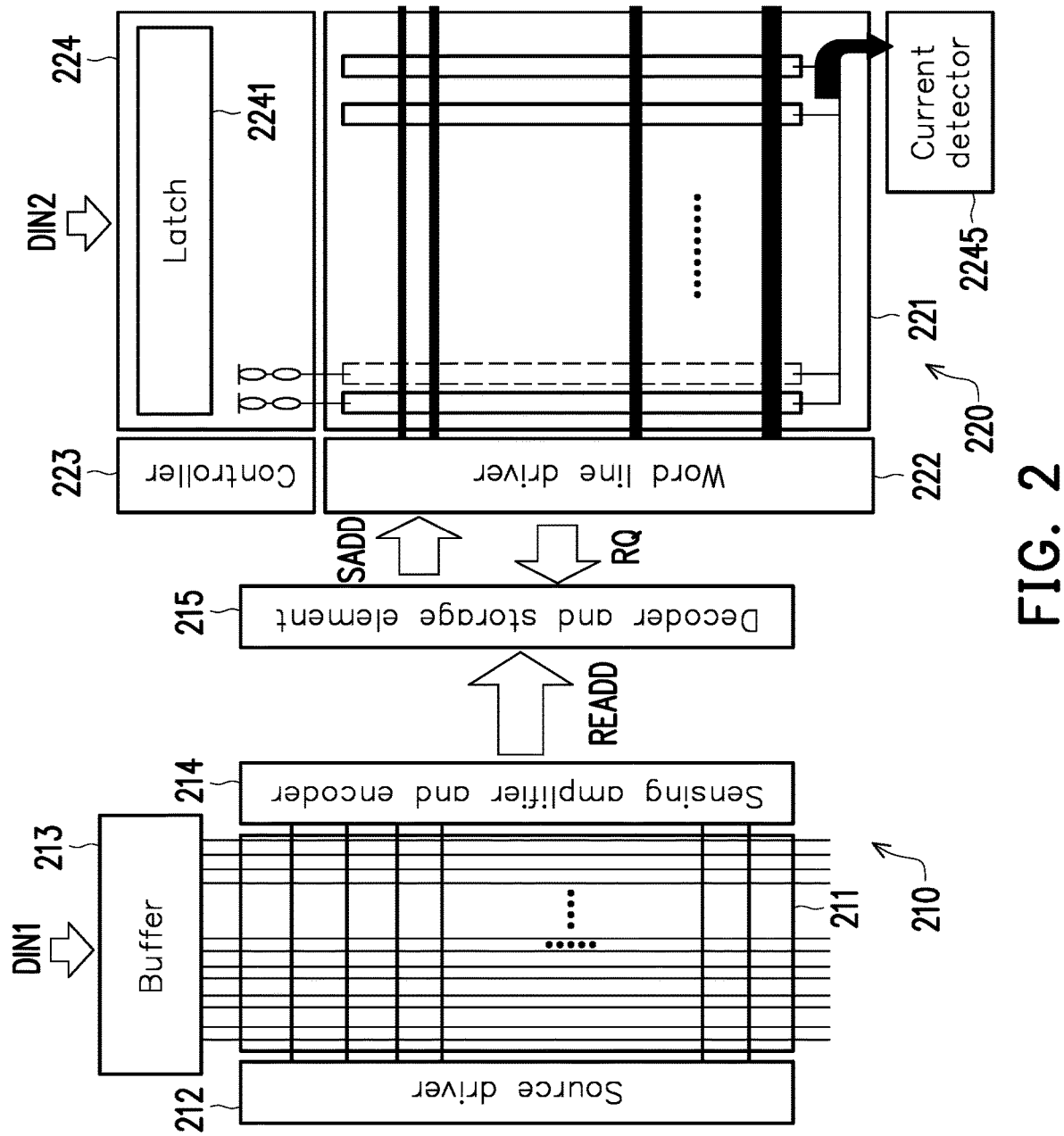
FIG. 2 is a schematic diagram of a multiplication and addition operation device according to another embodiment of the invention.

Referring to FIG. 2, FIG. 2 is a schematic diagram of a multiplication and addition operation device according to another embodiment of the invention. The multiplication and addition operation device 200 includes a feature information filter 210 and an in-memory calculator 220. In the embodiment, the feature information filter 210 is a multi-state content addressable memory (for example, a binary content addressable memory (BCAM) or a ternary content addressable memory (TCAM)). The in-memory calculator 220 is a NAND flash memory.

The feature information filter 210 includes a memory array 211, a source driver 212, a buffer 213, and a sensing amplifier and encoder 214. The buffer 213 is used to receive setting bits DIN1 of the input information, and provide a search signal to the memory array 211 according to setting bits DIN1 of the input information. The memory array 211 is used to store a plurality of designated bits of a plurality of feature information, and is used to compare the search signal with the designated bits of the feature information to generate a comparison result. In this embodiment, the memory array 211 may be composed of flash memory cells, resistive random-access memory (ReRAM) cells, phase-change memory (PCM) cells, magnetic random access memory (MRAM) cells or ferroelectric field-effect transistor (FeFET) memory cells. Moreover, the memory array 211 may have a two-dimensional structure or a three-dimensional structure, which is not limited by the invention.

The sensing amplifier and encoder 214 is used to sense the comparison result, and performs an encoding operation on the sensed comparison result, and accordingly generates an encoded selected address READD. The encoding operation performed by the sensing amplifier and encoder 214 is a priority encoding operation. In terms of a hardware framework, the sensing amplifier and encoder 214 may implemented by combining a matching line sensing amplifier of a multi-state content addressable memory and a priority encoder, which is not limited by the invention.

In the embodiment, the feature information filter 210 also includes a decoder and storage element 215. The decoder and storage element 215 may decode the encoded information generated by the sensing amplifier and encoder 214 to obtain the selected address SADD. The decoder and storage element 215 may temporarily store the selected address SADD, and provide the selected address SADD to the in-memory calculator 220.

On the other hand, the in-memory calculator 220 may be a NAND flash memory. The in-memory calculator 220 includes a memory array 221, a word line driver 222, a controller 223, a page buffer 224, and a current detector 2245. The memory array 221 stores all of the bits of the feature information. The page buffer 224 is used to receive the all bits DIN2 of the input information, and temporarily stores the all bits DIN2 of the input information through a latch 2241. On the other hand, the word line driver 222 may transmit a request signal RQ to the decoder and storage element 215 to set the decoder and storage element 215 for providing the selected address SADD.

When the multiplication and addition operation is performed, the controller 223 receives the selected address SADD, and controls the word line driver 222 to drive a plurality of word lines corresponding to the selected address SADD. At the same time, the latch 2241 provides the input information DIN to bit lines of the memory array 221, and enables execution of the multiplication and addition operation on the input information DIN and the data stored in the memory cell corresponding to the enabled word lines.

The current detector 2245 senses an operation result of the multiplication and addition operation by receiving a current generated by a memory cell string on a source line and based on a preset reference current.

Figure 3:
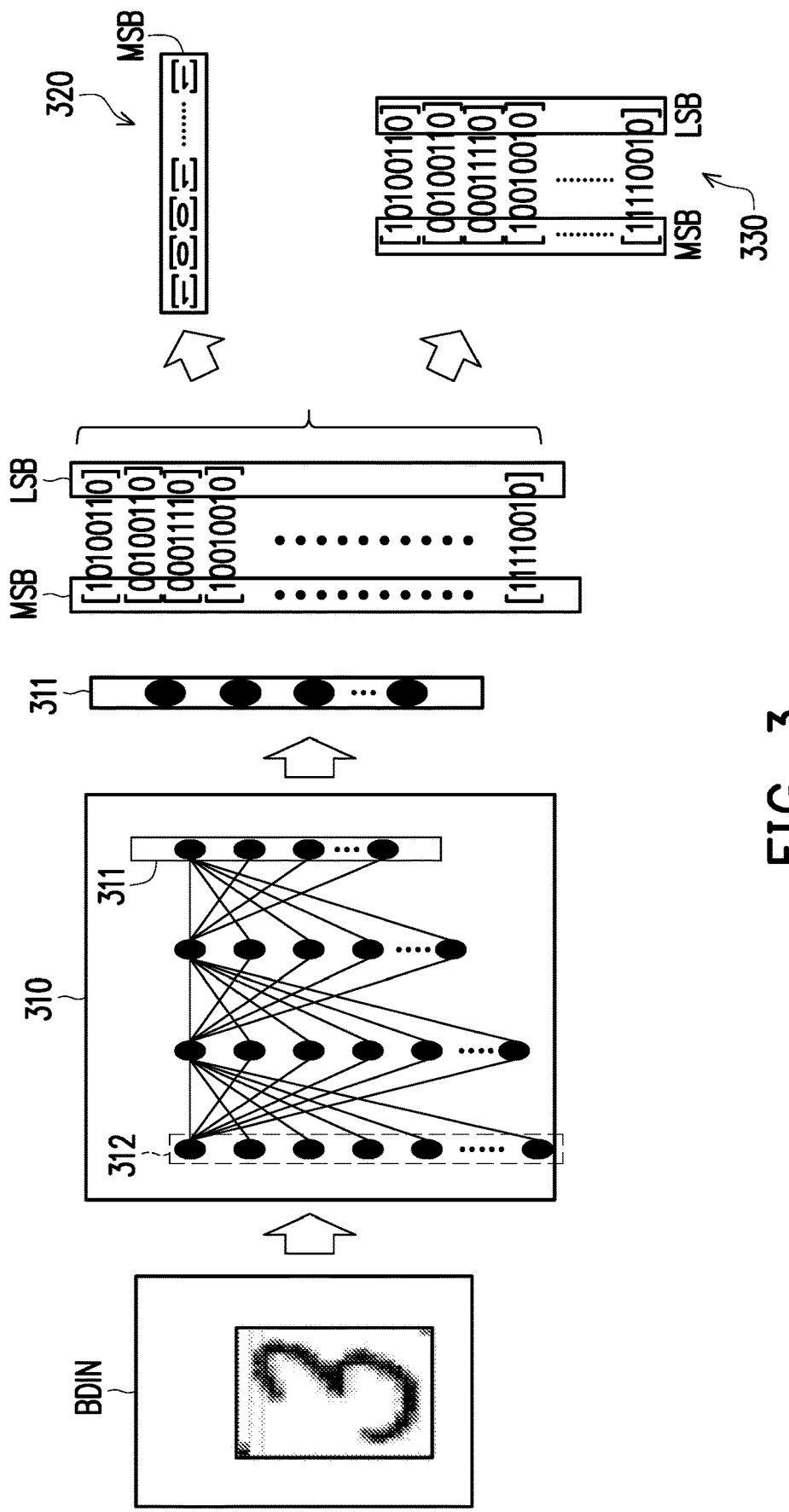
FIG. 3 is a schematic diagram of a method of generating feature information of a multiplication and addition operation device according to an embodiment of the invention.

Then, referring to FIG. 3, FIG. 3 is a schematic diagram of a method of generating feature information of a multiplication and addition operation device according to an embodiment of the invention. In the embodiment of FIG. 3, the multiplication and addition operation device may be configured with a feature extractor 310. The feature extractor 310 is used to perform a data extraction operation on sample information BDIN to obtain feature information. The feature extractor 310 may be a calculator of an artificial neural network (ANN), and the sample information BDIN may be data in the form of mixed national institute of standards and technology (MNIST). The feature extractor 310 may have a plurality of computing layers, where an input layer 312 may have a relatively large number of nodes, and an output layer 311 may have a relatively less number of nodes.

The feature extractor 310 may be implemented by using any form of circuits, such as a digital circuit, an in-memory calculator, and other hardware circuits that may perform neural network operations and familiar to those skilled in the art, which is not limited by the invention.

The feature extractor 310 may also write the maximum significant bit MSB of the feature information generated by the nodes of the output layer 311 into the feature information filter 320, and write the maximum significant bits MSB to the least significant bit (LSB) LSB of the feature information to the in-memory calculator 330.

Figure 4:
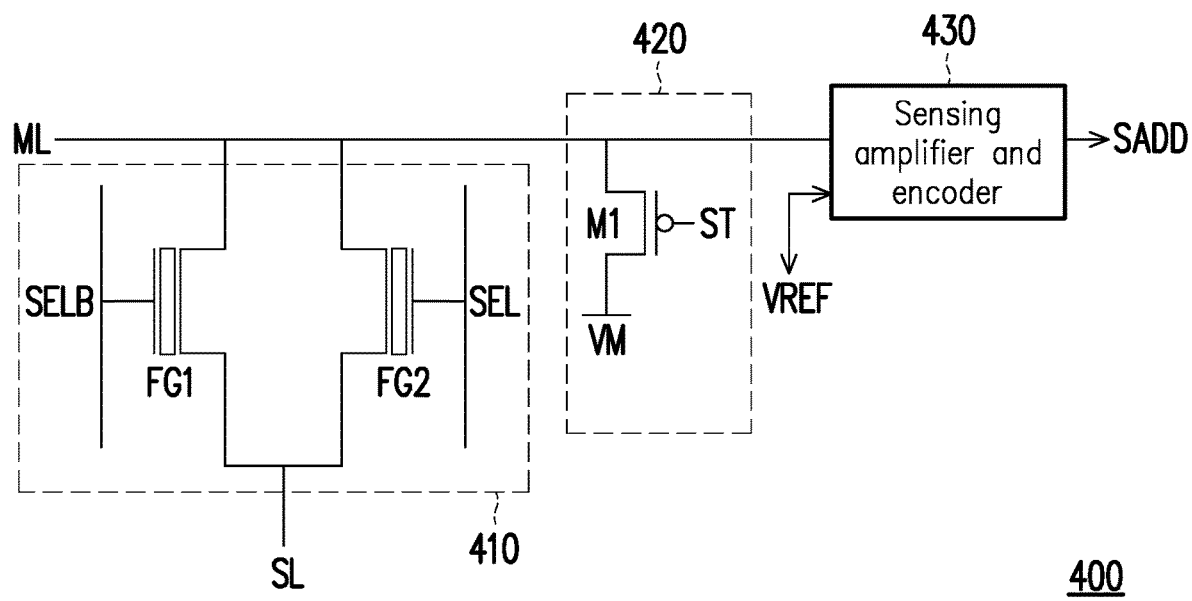
FIG. 4 is a schematic diagram of an implementation of a feature information filter according to an embodiment of the invention.

Then, referring to FIG. 4, FIG. 4 is a schematic diagram of an implementation of a feature information filter according to an embodiment of the invention. In the embodiment, the feature information filter may be implemented by a multi-state content addressable memory 400. The multi-state content addressable memory 400 includes a memory cell 410, a pre-charging circuit 420, and a sensing amplifier and encoder 430. The memory cell 410 includes transistors FG1 and FG2. A first end of the transistor FG1 is coupled to a matching line ML, a second end of the transistor FG1 is coupled to a source line SL, and a control end of the transistor FG1 receives a reverse search signal SELB. The transistor FG2 is coupled in parallel with the transistor FG1. A first end of the transistor FG2 is coupled to the matching line ML, a second end of the transistor FG2 is coupled to the source line SL, and a control end of the transistor FG2 receives a search signal SEL. Where, the reverse search signal SELB and the search signal SEL are mutually reverse signals.

The transistors FG1 and FG2 are floating gate transistors and respectively store complementary two pieces of data.

On the other hand, the pre-charging circuit 420 is coupled to the matching line ML. The pre-charging circuit 420 pre-charges a matching voltage on the matching line ML to a pre-charging voltage VM according to a start signal ST. The pre-charging circuit 420 is constructed by a transistor M1, and is turned on or turned off according to the start signal ST. The sensing amplifier and encoder 430 is coupled to the matching line ML. The sensing amplifier and encoder 430 compares the matching voltage on the matching line ML with a reference voltage VREF during a sensing period to generate a comparison result, and encodes the comparison result to generate the selected address SADD.

Figure 5A:
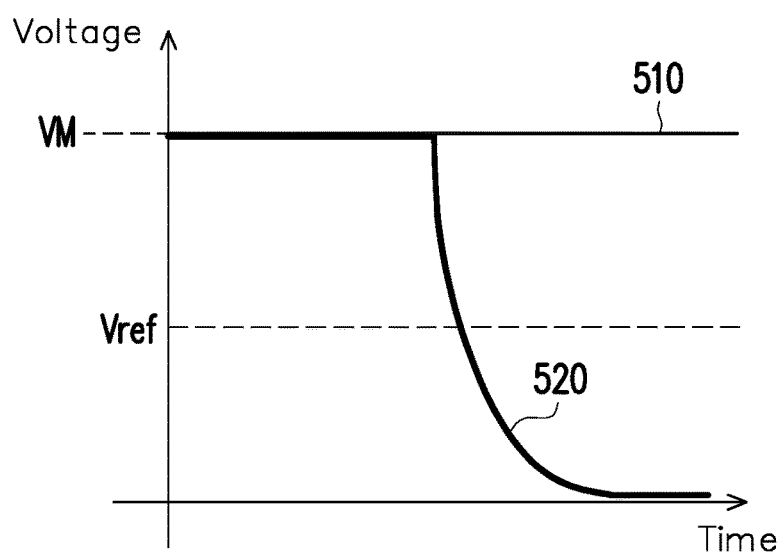
FIG. 5A is a waveform diagram of a sensing operation of a matching line of a feature information filter according to an embodiment of the invention.

In view of an operation detail, referring to FIG. 4 and FIG. 5A at the same time, FIG. 5A is a waveform diagram of a sensing operation of a matching line of a feature information filter according to an embodiment of the invention. Where, when the data stored in the memory cell 410 is logic 0, the transistors FG1 and FG2 may be respectively written with logic 0 and 1; when the data to be written is logic 1, the transistors FG1 and FG2 may be respectively written with logic 1 and 0.

In an initial period before the sensing period, the pre-charging circuit 420 may be turned on according to the start signal ST to pre-charge the matching voltage on the matching line ML to the pre-charging voltage VM. Then, the transistor M1 is turned off to enter the sensing period.

In the sensing period, when the data to be searched is logic 0, the search signal SEL may be equal to a search voltage VSR, and the reverse search signal SELB may be equal to a zero voltage. At this time, if the data stored in the memory cell 410 is logic 0, the transistors FG1 and FG2 are not turned on at this time. The matching voltage on the matching line ML may be held on the pre-charging voltage VM (such as a curve 510), which represents a match state of the comparison result. Comparatively, if the data stored in the memory cell 410 is logic 1, the transistor FG2 is turned on at this moment, and a discharge path is formed on the matching line ML and the source line SL. The matching voltage on the matching line ML is pulled down to be equal to a voltage on the source line SL (for example, 0 voltage), shown as a curve 520, which represents a mis-match state of the comparison result.

On the other hand, in the sensing period, when the data to be searched is logic 1, the reverse search signal SELB may be made equal to the search voltage VSR, and the search signal SEL may be equal to the zero voltage. At this time, if the data stored in the memory cell 410 is logic 0, the transistor FG1 may be turned on at this moment, and the matching voltage on the matching line ML is pulled down to the zero voltage (such as the curve 520), which represents the mis-match state of the comparison result. Comparatively, if the data stored in the memory cell 410 is logic 1, the transistors FG1 and FG2 are not turned on at the same time, and the matching line ML is held on the pre-charging voltage VM (such as the curve 510), which represents the match state of the comparison result.

It should be noted that the sensing amplifier and encoder 430 may compare the matching voltage on the matching line ML with the reference voltage VREF to determine whether the comparison result is matched or not. Where, the reference voltage VREF may be set between the pre-charging voltage VM and the zero voltage.

Figure 5B:
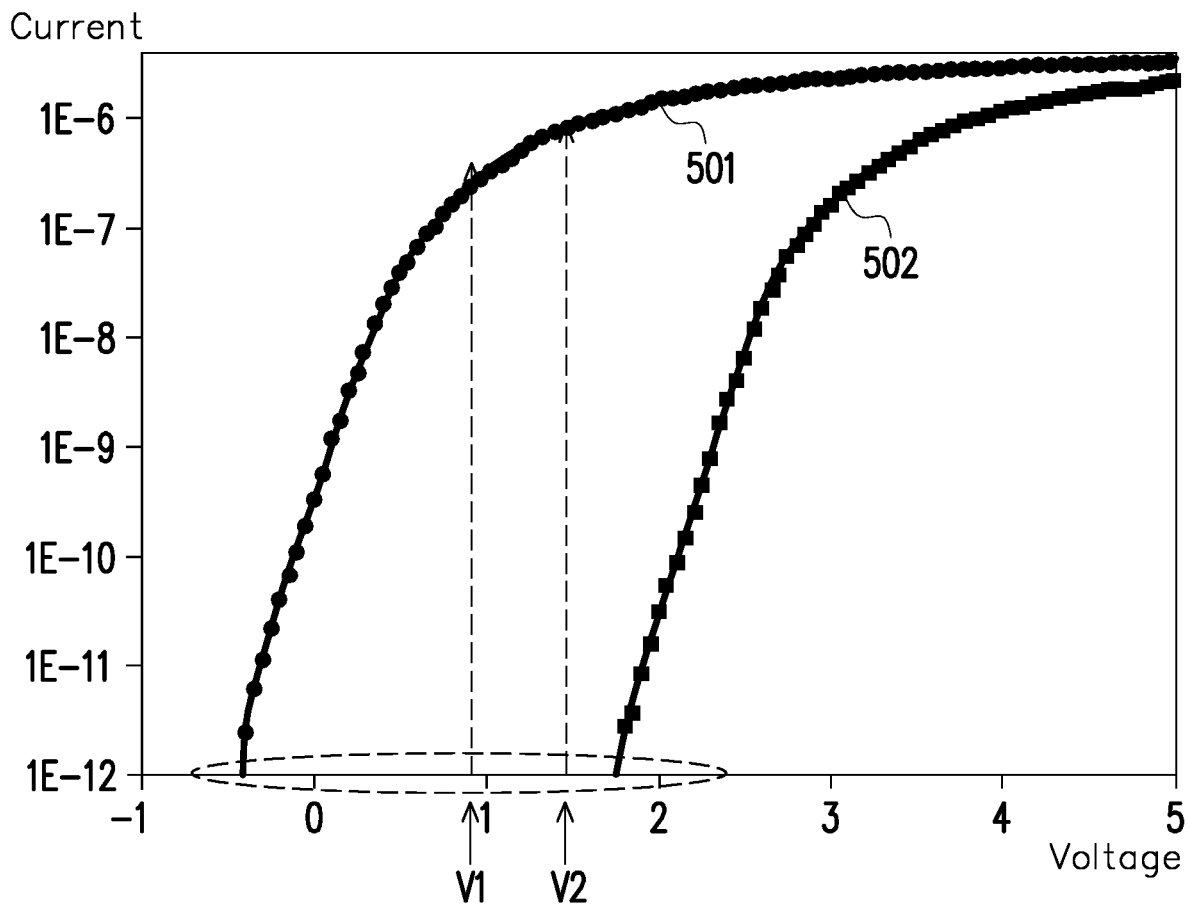
FIG. 5B is a characteristic curve diagram of a transistor in a ternary content addressable memory cell according to an embodiment of the invention.

Referring to FIG. 4 and FIG. 5B, FIG. 5B is a characteristic curve diagram of a transistor in a ternary content addressable memory cell according to an embodiment of the invention. Where, a curve 501 is a characteristic curve when the transistor is written with data 0, and a curve 502 is a characteristic curve when the transistor is written with data 1. If the search voltage VSR equal to a voltage V1 (for example, 1 volt) is applied to a gate of the transistor, a current ratio of a turned-on transistor to a turned-off transistor may be greater than $10^6$. If the search voltage VSR equal to a voltage V2 (for example, 1.5 volts) is applied to the gate of the transistor, the current ratio of the turned-on transistor to the turned-off transistor may be greater than $10^5$.

Figure 5C:
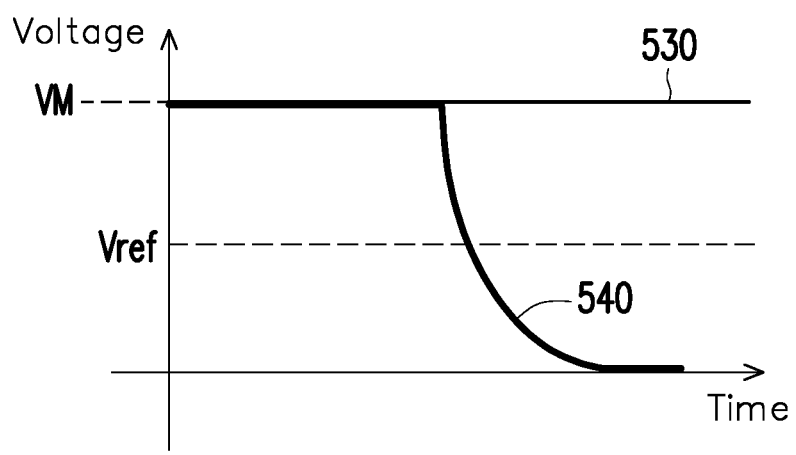
FIG. 5C is a waveform diagram of a sensing operation of a matching line of a feature information filter according to an embodiment of the invention.

Referring to FIG. 4 and FIG. 5C, FIG. 5C is a waveform diagram of a sensing operation of the matching line of the feature information filter according to an embodiment of the invention. Compared with the waveform of FIG. 5A, the waveform of FIG. 5C is an implementation of a reverse search. During the sensing period, when the data to be searched is logic 0, the reverse search signal SELB may be equal to the search voltage VSR, and the search signal SEL may be equal to the zero voltage. At this time, if the data stored in the memory cell 410 is logic 0, the transistor FG1 is turned on at this moment. The matching voltage on the matching line ML may be pulled down to zero voltage (such as a curve 540), which represents the match state of the comparison result. Comparatively, if the data stored in the memory cell 410 is logic 1, the transistors FG1 and FG2 are not turned on at this moment. The matching voltage on the matching line ML is held on the pre-charging voltage VM, as shown in a curve 530, which represents the mis-match state of the comparison result.

In addition, in the sensing period, when the data to be searched is logic 1, the search signal SEL may be equal to the search voltage VSR, and the reverse search signal SELB may be made equal to the zero voltage. At this time, if the data stored in the memory cell 410 is logic 0, the transistors FG1 and FG2 are not turned on at this moment, and the matching voltage on the matching line ML is maintained equal to the pre-charging voltage VM (such as the curve 530), which represents the mis-match state of the comparison result. Comparatively, if the data stored in the memory cell 410 is logic 1, the transistor FG2 may be turned on at this moment, and the matching line ML is pulled down to a voltage of 0 (such as the curve 540), which represents the match state of the comparison result.

Figure 6:
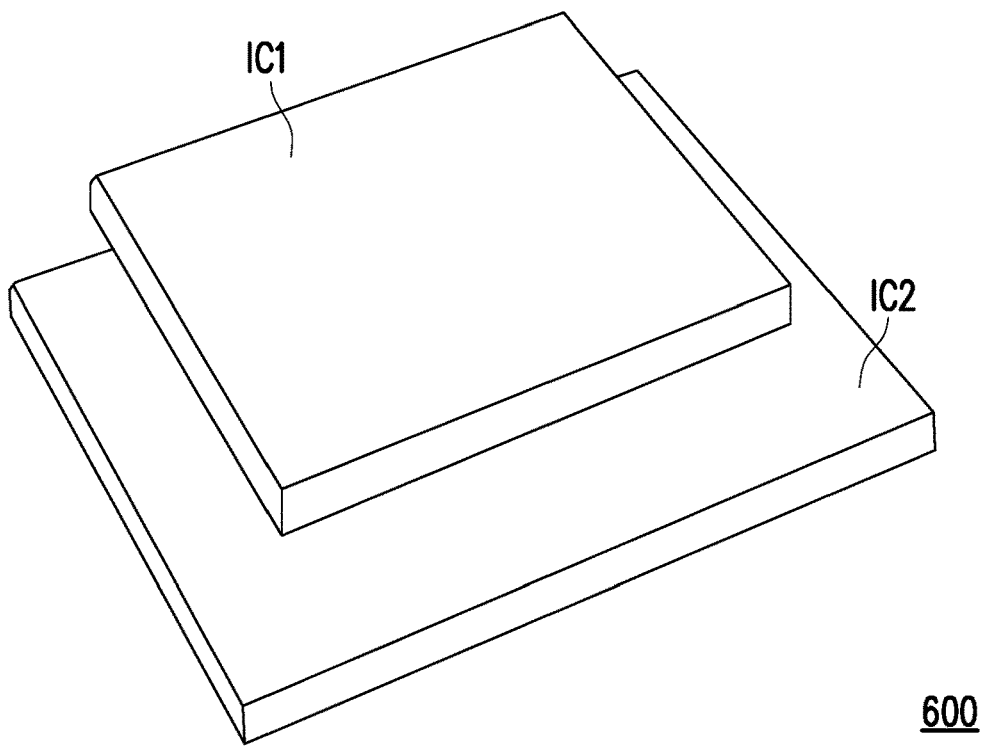
FIG. 6 is a schematic diagram of an implementation of a multiplication and addition operation device with a three-dimensional framework according to an embodiment of the invention.

Referring to FIG. 6, FIG. 6 is a schematic diagram of an implementation of a multiplication and addition operation device with a three-dimensional framework according to an embodiment of the invention. Where, a multiplication and addition operation device 600 may be composed of two different chips IC1 and IC2. The feature information filter in the multiplication and addition operation device 600 may be arranged on the chip IC1. The in-memory calculator in the multiplication and addition operation device 600 may be arranged on the chip IC2. The chip IC1 and the chip IC2 may be arranged in an overlapping manner and integrated in a manner of multi-chip package. Through the embodiments of the invention, the multiplication and addition operation device 600 may achieve the advantages of low power consumption, high operation efficiency, low size, and high circuit density.

In present embodiment, the chip IC1 and IC2 may respectively be a NOR flash memory and a NAND flash memory, and respectively used to implement the feature information filter and the in-memory calculator.

Figure 7:
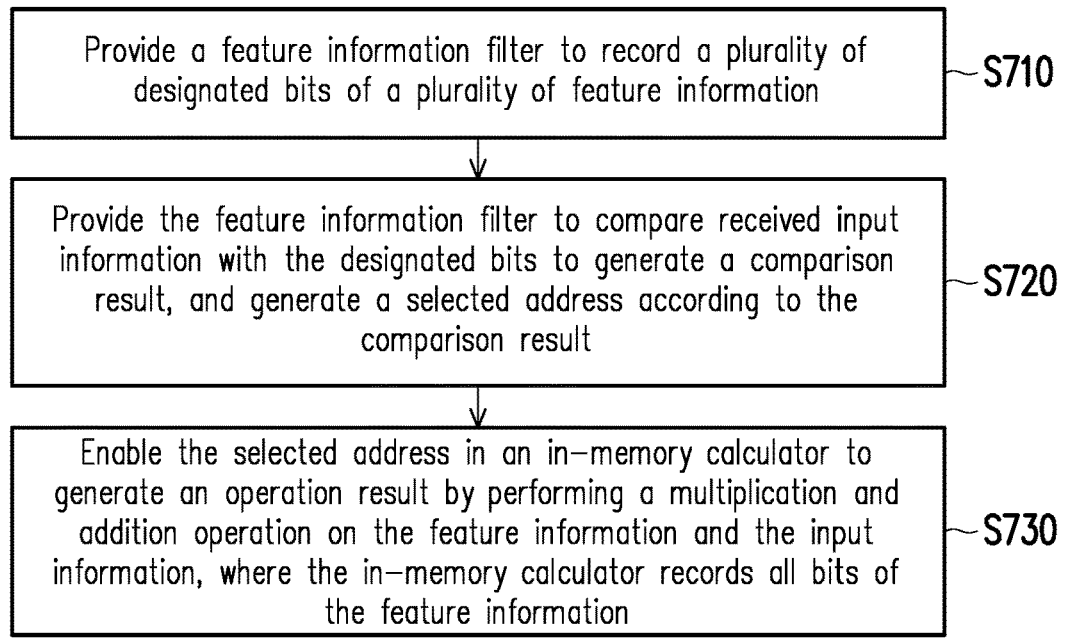
FIG. 7 is a flowchart of a control method of a multiplication and addition operation according to an embodiment of the invention.

Referring to FIG. 7, FIG. 7 is a flowchart of a control method of a multiplication and addition operation according to an embodiment of the invention. In step S710, a feature information filter is provided to record a plurality of designated bits of a plurality of feature information. Then, in step S720, the feature information filter is provided to compare received input information with the designated bits to generate a comparison result, and generate a selected address according to the comparison result. In step S730, the selected address in an in-memory calculator is enabled to generate an operation result by performing a multiplication and addition operation on the feature information and the input information, where the in-memory calculator records all bits of the feature information.

In summary, the multiplication and addition operation device of the invention first performs a filtering operation on input data through the feature information filter, and the in-memory calculator enables a part of the feature information to perform a multiplication and addition operation with the input information. In this way, the power consumed by the multiplication and addition operation device in operation is reduced, and the calculation efficiency is increased.

What is claimed is:

1. A multiplication and addition operation device, comprising:

a feature information filter, recording a plurality of designated bits of a plurality of feature information, comparing a plurality of setting bits of received input information with the designated bits to generate a comparison result, and generating a selected address according to the comparison result; and an in-memory calculator, coupled to the feature information filter, wherein the in-memory calculator records all bits of the feature information, the in-memory calculator generates an operation result by performing a multiplication and addition operation on the feature information and all bits of the input information according to the selected address.

2. The multiplication and addition operation device as claimed in claim 1, wherein the designated bits are respectively the most significant bits of the feature information.

3. The multiplication and addition operation device as claimed in claim 1, wherein the feature information filter determines a matching state of the plurality of setting bits in the input information with the designated bits to generate the comparison result, and executes an encoding operation according to the comparison result to generate the selected address.

4. The multiplication and addition operation device as claimed in claim 1, wherein the feature information filter is a multi-state content addressable memory or an analog content addressable memory.

5. The multiplication and addition operation device as claimed in claim 1, wherein the feature information filter has a memory array, the memory array has a two-dimensional structure or a three-dimensional structure, the memory array is composed of flash memory cells, resistive random-access memory cells, phase-change memory cells, magnetic random-access memory cells or ferroelectric field-effect transistor memory cells.

6. The multiplication and addition operation device as claimed in claim 4, wherein the multi-state content addressable memory comprises a memory array composed of a plurality of memory cells, and each of the memory cells comprises:

a first transistor, having a first end coupled to a matching line, a second end coupled to a source line, and a control end receiving a reverse search signal; and a second transistor, having a first end coupled to the matching line, a second end coupled to the source line, and a control end receiving a search signal, wherein the first transistor and the second transistor are floating gate transistors.

7. The multiplication and addition operation device as claimed in claim 6, wherein the multi-state content addressable memory further comprises:

a pre-charging circuit, coupled to the matching line, and pre-charging a matching voltage on the matching line to a pre-charging voltage according to a start signal;

a sensing amplifier and encoder, coupled to the matching line, comparing the matching voltage with a reference voltage during a sensing period to generate the comparison result, and encoding the comparison result to generate the selected address.

8. The multiplication and addition operation device as claimed in claim 7, wherein when content stored in each of the memory cells matches the search signal, the matching voltage is pulled down to a reference ground voltage during the sensing period, and when the content stored in each of the memory cells does not match the search signal, the matching voltage is held on the pre-charging voltage during the sensing period.

9. The multiplication and addition operation device as claimed in claim 7, wherein when content stored in each of the memory cells does not match the search signal, the matching voltage is pulled down to a reference ground voltage during the sensing period, and when the content stored in each of the memory cells matches the search signal, the matching voltage is held on the pre-charging voltage during the sensing period.

10. The multiplication and addition operation device as claimed in claim 1, further comprising:
a feature extractor, executing a data extraction operation on sample information to obtain the feature information, and writing the designated bits of the feature information into the feature information filter, so that all bits of the feature information are written into the in-memory calculator.

11. The multiplication and addition operation device as claimed in claim 1, wherein the in-memory calculator is an NAND flash memory.

12. The multiplication and addition operation device as claimed in claim 1, wherein the feature information filter is arranged on a first chip, and the in-memory calculator is arranged on a second chip, and the first chip is different from the second chip.

13. A control method of a multiplication and addition operation, comprising:
providing a feature information filter to record a plurality of designated bits of a plurality of feature information;
providing the feature information filter to compare a plurality of setting bits of received input information with the designated bits to generate a comparison result, and generating a selected address according to the comparison result; and
enabling the selected address in an in-memory calculator to generate an operation result by performing a multiplication and addition operation on all bits of the feature information and the input information, wherein the in-memory calculator records all bits of the feature information.

14. The control method of the multiplication and addition operation as claimed in claim 13, wherein the designated bits are respectively the most significant bits of the feature information.

15. The control method of the multiplication and addition operation as claimed in claim 13, wherein the step of generating the selected address according to the comparison result comprises:
determining a matching state of the plurality of setting bits in the input information with the designated bits to generate the comparison result, and executing an encoding operation according to the comparison result to generate the selected address.

16. The control method of the multiplication and addition operation as claimed in claim 13, further comprising:
executing a data extraction operation on sample information to obtain the feature information, writing the designated bits of the feature information into the feature information filter, and writing all bits of the feature information into the in-memory calculator.

* * * * *